A. LARSON.
CATTLE KILLING DEVICE.
APPLICATION FILED APR. 27, 1916.

1,214,929. Patented Feb. 6, 1917.

INVENTOR:
Anton Larson.
BY his ATTORNEY: A. M. Carlsen

UNITED STATES PATENT OFFICE.

ANTON LARSON, OF DENHAM, MINNESOTA, ASSIGNOR OF ONE-HALF TO FRED L. OLSON, OF DENHAM, MINNESOTA.

CATTLE-KILLING DEVICE.

1,214,929.      Specification of Letters Patent.      Patented Feb. 6, 1917.

Application filed April 27, 1916. Serial No. 93,873.

*To all whom it may concern:*

Be it known that I, ANTON LARSON, a subject of the King of Sweden, residing at Denham, in the county of Pine and State of Minnesota, have invented a new and useful Cattle-Killing Device, of which the following is a specification.

This invention relates to means for rendering slaughter animals unconscious before killing them. The objects of the device are, first, to save the animal from the fear and torture usually involved by stabbing or bleeding them to death. A second object is to attain said result without chloroform or other anesthetics and without shooting the animal, since the latter method would in a slaughter house torture the other animals by alarm and fear.

My improved means consists of a strong spring gun by which the end of a plunger is driven into the brains of the animal to render it unconscious and is then removed, the greater part of it being at all times contained in the barrel of the gun.

In the accompanying drawing:—

Figure 1:
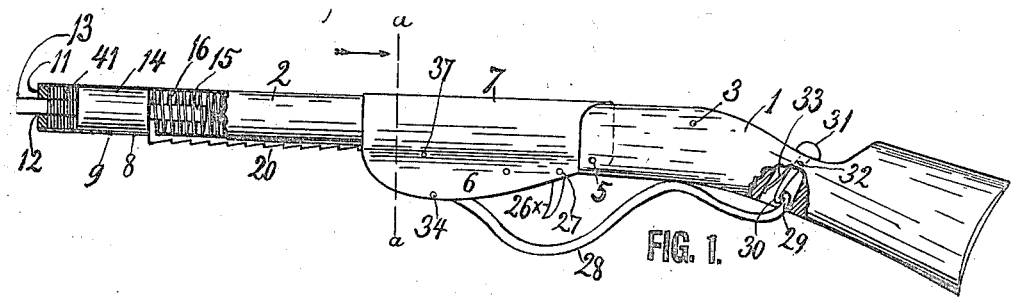
Figure 2:
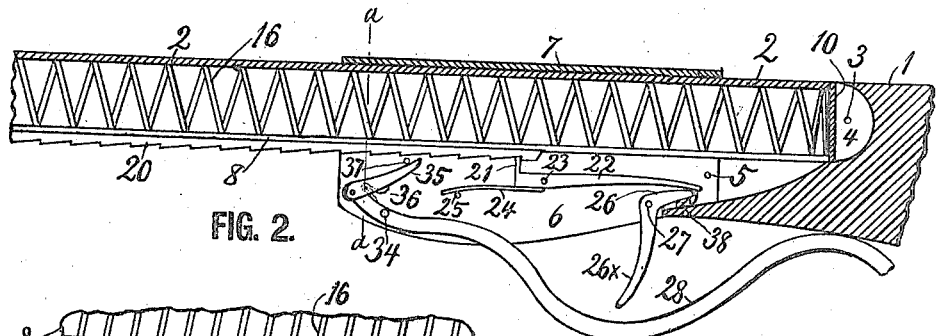
Figure 3:
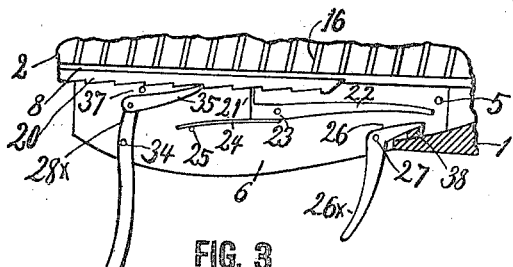
Figure 4:
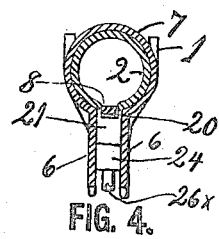
Figure 5:
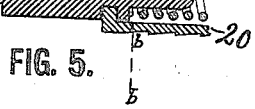
Figure 6:

Figure 1 is a side view of my invention with some portions broken away. Fig. 2 is a substantially central longitudinal vertical section of the middle portion of Fig. 1 on an enlarged scale. Fig. 3 is a portion of Fig. 2 with the mechanism in changed position. Fig. 4 is a cross section on the line *a—a* Figs. 1 or 2 with the lever 28 and pawl 37 omitted. Fig. 5 is a longitudinal diametrical section of the plunger and the rack and spring in rear of it. Fig. 6 is a cross section of the rack bar at the line *b—b* Fig. 5.

Referring to the drawing by reference numerals, 1 designates the stock and 2 the barrel of the gun; said stock may preferably be of wood, and secured on it by a pin or screw 3 in a rearward rib 4 (see Fig. 2), and secured by a screw 5 are the ends of two cheeks 6 of a downwardly open sleeve 7 which is secured about the barrel, said cheeks forming the housing for operating parts presently to be fully described.

The barrel 2 is provided with a downward slit 8 extending from the point 9 in Fig. 1 to the bottom 10 (shown in Fig. 2). The front end of the barrel is closed by a screw plug 11 having a central aperture 12 for the reduced portion or prong 13 of a plunger 14, which slides freely in the barrel and has its rear end formed with a guide 15 for the adjacent end of the main spring 16, which when the gun is loaded or set is compressed between the bottom 10 and a shoulder 17 of the plunger. The plunger has also an annular groove 18 in which engages a loop 19 (see Figs. 5 and 6) of a ratchet rack 20, which extends rearwardly guided by the slit 8 and engaging by its rearmost tooth the tooth 21 of a lock lever 22 when the rack is in its forward position.

The lever 22 is pivoted at 23 between the cheeks 6 and is normally held in engagement with the rack by a spring 24 which is fixed to the lever and bears against a fixed pin 25. The rear end of said lever rests upon the short arm of a trigger 26 which is pivoted at 27 and has its finger-operated downward arm 26ˣ guarded by a loading lever 28, when the latter is closed up under the stock and has the hook 29 at its rear end interlocked with a hook 30 of a finger catch 31, which is pivoted at 32 and provided with a spring 33 which tends to engage its hook 30 with the hook 29 until unlocked by a rearward pressure on the head end 31 of the catch.

Said loading lever is fulcrumed at 34, and pivoted to its short arm 28ˣ is a pawl 35, which by a spring 36 (see Fig. 2) is held in engagement with the rack 8 except when the lever 28 is folded into idle position which draws the pawl away from the rack unless it could swing extra far upward on its pivot, but this is prevented by a pin 37. 38 (in Figs. 2 and 3) is a transverse bar between the cheek plates 6, for the short arm of the trigger to rest on when depressed by the lever 22 and spring 24 and by such resting hold the trigger arm 26ˣ in ready position for operation.

The front prong or rod 13 of the plunger is preferably concave in the end, as shown at 39 in Fig. 5, so as to form surrounding sharp edges 40.

In Fig. 1 is shown how a light coil spring 41 is placed between the front shoulders of the plunger 14 and the internal collar 11 of the barrel so as to stop the forward stroke of the plunger with as little noise and strain on the barrel as possible, and to withdraw the prong from the head of the cattle after each operation.

In the operation of the device, when a steer or other cattle or animal is to be killed at a slaughter house or other place, the lever 28 is released from the hook 30 and swung back and forth on its fulcrum until the pawl 35 has step by step moved the rack and the plunger rearwardly to the desired degree according to the size of the animal, and thereby compress the spring 16; for each move the pawl makes the tooth 21 of lever 22 holds the rack while the pawl takes a new hold. The lever 28 is then folded into idle position, which retracts the pawl 35 from the rack. The muzzle of the gun is then placed to the forehead of the animal and as the trigger is pulled, the main spring drives the plunger forward so the short rod 13 darts through the skull and into the brains of the animal, which is thereby rendered unconscious either permanently or at least long enough for cutting its arteries at the neck and thereby bleeding it to death before it has had time to recover consciousness. The animal is thus killed without pain or suffering, and the rod or prong 13, which after the shot is at once retracted, may serve its purpose as a bullet many thousands of times over again in killing other cattle.

What I claim is:—

1. In a device of the kind described, a spring barrel having a longitudinal slit and its front end closed by an internal collar, a plunger arranged to slide in the barrel and having a forward rod arranged to project through and beyond the collar, a compressible coil spring rearward of the plunger, means to prevent escape of said spring through the rear end of the barrel, a ratchet rack slidable in the slit and having its front end connected with the plunger, a lever having a long operating arm and a short arm with a pivoted pawl on it for engaging and moving the rack bar, a spring-pressed lever having a short arm with a tooth arranged to engage the rack and hold it while the pawl takes a new hold, said lever having also a long arm, a trigger arranged to act on said long arm and thereby release the rack, and means for automatically holding the pawl disengaged from the rack when the operating lever is folded into idle position.

2. In a device of the kind described, a spring barrel having a longitudinal slit and its front end closed by an internal collar, a plunger arranged to slide in the barrel and having a forward rod arranged to project through and beyond the collar, a compressible coil spring rearward of the plunger, means to prevent escape of said spring through the rear end of the barrel, a ratchet rack slidable in the slit and having its front end connected with the plunger, a lever having a long operating arm and a short arm with a pivoted pawl on it for engaging and moving the rack bar, a spring-pressed lever having a short arm with a tooth arranged to engage the rack and hold it while the pawl takes a new hold, said lever having also a long arm, a trigger arranged to act on said long arm and thereby release the rack, and means for automatically holding the pawl disengaged from the rack when the operating lever is folded into idle position, and a spring-pressed finger operated catch automatically locking the operating lever in idle position.

3. In a device of the kind described, a spring barrel having a longitudinal slit and its front end closed by an internal collar, a plunger arranged to slide in the barrel and having a forward rod arranged to project through and beyond the collar, a compressible coil spring rearward of the plunger, means to prevent escape of said spring through the rear end of the barrel, a ratchet rack slidable in the slit and having its front end connected with the plunger, a lever having a long operating arm and a short arm with a pivoted pawl on it for engaging and moving the rack bar, a spring-pressed lever having a short arm with a tooth arranged to engage the rack and hold it while the pawl takes a new hold, said lever having also a long arm, a trigger arranged to act on said long arm and thereby release the rack, and means for automatically holding the pawl disengaged from the rack when the operating lever is folded into idle position, and a comparatively light coil spring arranged between the plunger and the internal front collar in the barrel.

4. In a device of the kind described, a spring barrel having a longitudinal slit and its front end closed by an internal collar, a plunger arranged to slide in the barrel and having a forward rod arranged to project through and beyond the collar, a compressible coil spring rearward of the plunger, means to prevent escape of said spring through the rear end of the barrel, a ratchet rack slidable in the slit and having its front end connected with the plunger, a lever having a long operating arm and a short arm with a pivoted pawl on it for engaging and moving the rack bar, a spring-pressed lever having a short arm with a tooth arranged to engage the rack and hold it while the pawl takes a new hold, said lever having also a long arm, a trigger arranged to act on said long arm and thereby release the rack, and means for automatically holding the pawl disengaged from the rack when the operating lever is folded into idle position, a wooden stock secured upon the rear portion of said spring barrel, a downwardly open-sided sleeve secured about the rear portion of the barrel and having downwardly projecting parallel cheeks between which said levers and trigger are mounted.

In testimony whereof I affix my signature.

ANTON LARSON.